United States Patent [19]

Iwashita et al.

[11] 4,455,075

[45] Jun. 19, 1984

[54] ELECTRIC MOTOR DRIVE DEVICE CAMERA

[75] Inventors: Tomonori Iwashita; Yoshitaka Watanabe, both of Tokyo; Hidehiko Fukahori, Kanagawa, all of Japan

[73] Assignee: Canon Kabushiki Kaisha, Tokyo, Japan

[21] Appl. No.: 391,400

[22] Filed: Jun. 23, 1982

[30] Foreign Application Priority Data

Jul. 3, 1981 [JP] Japan ............................. 56-99404[U]
Jul. 10, 1981 [JP] Japan ........................... 56-102480[U]

[51] Int. Cl.³ .............................................. G03B 1/12
[52] U.S. Cl. ................................................. 354/173.1
[58] Field of Search ......................................... 354/173

[56] References Cited

U.S. PATENT DOCUMENTS 3,853,396 12/1974 Ogiso et al. ......................... 354/173
4,272,173 6/1981 Iwashita et al. .................... 354/173

Primary Examiner—Michael L. Gellner
Attorney, Agent, or Firm—Toren, McGeady and Stanger

[57] ABSTRACT

An electric motor drive device for a camera has at least two sets of gear trains of different gear ratios for transmitting the driving force of a motor to the winding mechanism of a camera and a change-over mechanism for automatically selecting the most suitable gear train out of these gear trains depending on the condition of batteries attached to the electric motor drive device, so that the driving force of the motor can be transmitted to the winding mechanism through the gear train most suited to the condition of the motor.

4 Claims, 12 Drawing Figures

ELECTRIC MOTOR DRIVE DEVICE CAMERA

BACKGROUND OF THE INVENTION

1. Field of the Invention

This invention relates to an electric motor drive device for a camera and more particularly to a motor drive device provided with at least two gear trains for transmitting the driving force of a motor to the winding mechanism of the camera.

2. Description of the Prior Art

Generally, an electric motor drive device of the type adapted to perform camera winding by an electric motor driving operation has a DC motor rotated by the power of a battery or batteries and has a camera winding mechanism which is operated by the rotation of the motor To obtain an electric motor drive device which is small in size, light in weight and which performs suitably, it is important to select the gear ratio of the reduction gears to be used in the driving force transmission mechanism as well as the motor and the battery.

Assuming that the rotational torque of the motor is T, the rotational speed r.p.m. of the motor is N, the terminal voltage of the motor is E, the output of the motor is P, the efficiency of the motor is η, the current consumption by the electric motor drive device is i, the voltage of the battery is V, the internal resistance of the battery is r, the winding torque of the camera (or a loaded torque required in carrying out film winding and shutter charging) is H and the gear ratio (or a reduction ratio of the transmission gears between the motor and the winding coupler of the camera) is ε, it is known that the following relation in a motor drive device of this type is obtained:

$$P = 2\pi NT \quad (1)$$

$$T = H/\epsilon = K_1 \cdot i \quad (2)$$

$$\eta = P/V \cdot i \quad (3)$$

$$N = K_2 \cdot E - K_3 \cdot T \quad (4)$$

$$E = V - r \cdot i \quad (5)$$

($K_1$, $K_2$ and $K_3$: Constants)

In the accompany drawings, FIG. 1 shows the rotational torque T obtained from these relations. Referring to this drawing, a reference symbol T1 indicates a point at which the efficiency η of the motor reaches a maximum value and T2 indicates a point at which the output P of the motor reaches a maximum value.

The open voltage V and the internal resistance r of the battery vary with the kind of battery used and/or with the amount of electric discharge W that has been effected. It is known that the electric discharge amount W can be expressed by:

$$W = (\text{winding time}) \times (\text{current consumption } i) \times \text{number of photographed frames} \quad (6)$$

Meanwhile, the rotational speed (r.p.m.) of the DC motor used for such an electric motor drive device varies in proportion to the terminal voltage E. Therefore, an auxiliary power source connected in series with the power source of an electric motor drive device of this type has been proposed which has higher voltages available, as necessary, so that the winding speed can be changed by thus increasing the rotational frequency of the motor, as disclosed by U.S. Pat. No. 3,853,396 which issued on Dec. 10, 1974.

However, the rotational speed N of the motor is restricted by the mechanical strength of the motor, such as the strength of the bearing metal thereof, etc. Under a nonloaded condition, the limit of the rotational speed of a motor is generally within a range from 1000 to 15000 r.p.m. A rotational speed exceeding the limit would result in motor breakage. To solve this problem, therefore, it is necessary to use an expensive motor having a sufficiently high degree of mechanical strength. Furthermore, the arrangement of a series connected auxiliary power source to increase the rotational speed N of the motor for a higher winding speed by thus raising the terminal voltage E of the motor results in an increased rotational speed of the whole winding system. Then, another problem that arises is that the working sound becomes very noisy as the winding speed increases.

Furthermore, power sources used for electric motor drive devices of this type are selected generally from penlight batteries (size AA), a manganese type battery, and, in some cases, from penlight batteries (size AA) of the Ni-cd type. The manganese type battery (hereinafter called the manganese battery) differs from the Ni-cd type battery (hereinafter called the Ni-cd battery) in constant current discharge characteristics as shown in FIGS. 2(a) and 2(b). The manganese battery has a high internal resistance r and the voltage V and the internal resistance r vary to a great extent relative to the amount of discharge W. In addition, the discharge amount W varies with current consumption i. Therefore, when using the manganese battery, it is preferable to have the current consumption as low as possible within the necessary range of current consumption. When using the Ni-cd battery, the internal resistance is low and the voltage V and internal resistance vary to a lesser extent in relation to the amount of discharge W. It is known that, compared with the manganese battery, the Ni-cd battery allows a higher degree of current consumption i.

Accordingly, the manganese and Ni-cd batteries, which thus differ in characteristics, are used together for an electric motor drive device since the manganese battery can be readily replaced and the Ni-cd battery excels in performance even though it takes time for charging, etc. When the characteristic (or the gear ratio ε) of the electric motor drive device is set to suit one of the batteries, the conditions required for appropriate use of the other cannot be satisfied. Under these conditions, there arises the following problem:

Generally, in an electric motor drive device, in order to ensure a certain degree of efficiency (or the amount of film to be fed), the rotational torque T must be set between a maximum efficiency point T1 and a maximum output point T2. However, as shown in FIGS. 3(a) and 3(b), the maximum efficiency point T11 and the maximum output point T21 obtainable with the manganese battery are lower than those (T12 and T22) obtainable with the Ni-cd battery. Therefore, when the rotational torque T is set at a value suitable for the manganese battery, use of the Ni-cd battery results in a much lowered output P. Then, the winding speed becomes insufficient. Furthermore, when the rotational torque T is set at a value suitable for the Ni-cd battery, use of the manganese battery results in a much lowered efficiency η. The lowered efficiency causes a great reduction in the amount of film which is fed.

The rotational torque T of the motor is determined from the gear ratio ε through Formula (2) above if the winding torque H of the camera is unvarying. In the conventional electric motor drive device having a fixed gear ratio, therefore, it has been extremely difficult to obtain a certain acceptable winding speed and a certain acceptable amount of film feeding when both the manganese battery and Ni-cd battery are used.

The present invention is directed to the solution of the above-mentioned problem encountered when using conventional electric motor drive devices.

It is, therefore, an object of the invention to provide an electric motor drive device in which the gear ratio of the transmission gear arrangement is shiftable according to the conditions of the batteries to be used, so that the winding action of the camera can be carried out in an optimum condition according to the number of batteries and the particular kinds to be used.

It is another object of the invention to provide an electric motor drive device which shifts the gear ratio of the transmission gears by use of an auxiliary power source in such a manner that the winding speed of the camera can be increased without increasing the rotational speed of the motor.

It is a further object of the invention to provide an electric motor drive device in which the gear ratio of transmission gears is shiftable depending on the kind of batteries used, so that the winding speed and amount of film fed will not be lowered by the use of different kinds of batteries.

These and further objects, features and advantages of the invention will become apparent from the following detailed description of preferred embodiments thereof taken in conjunction with the accompanying drawings.

SUMMARY OF THE INVENTION

These and other objects of the invention are attained in an electric motor drive device for a camera with an attachable battery pack which includes a motor, a first gear train for transmitting the driving force of the motor, and a second gear train for transmitting the driving force of the motor. The second gear train has a gear ratio which differs from that of the first gear train. The apparatus also includes change-over means for selecting either the first or the second gear train. The change-over means is shiftable responsive to the attachment of the battery pack to the motor drive device.

DETAILED DESCRIPTION OF PREFERRED EMBODIMENTS

Figure 1:
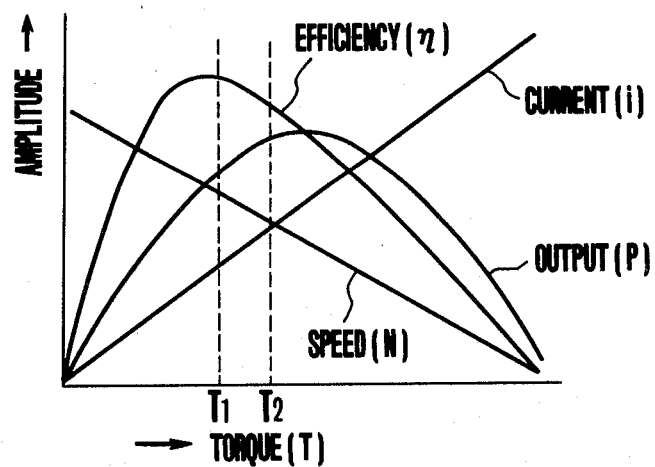
FIG. 1 is a graph showing characteristic curves of a DC motor.
Figure 2A:
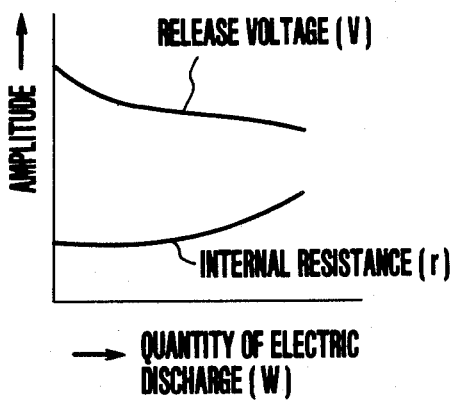
FIGS. 2(a) and 2(b) are graphs showing the constant current discharge characteristic curves of the manganese battery and the Ni-cd battery.
Figure 2B:
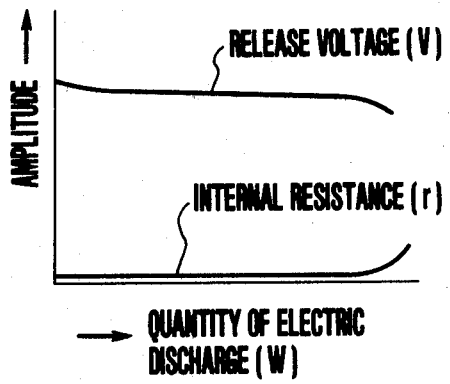

Embodiment examples of the present invention are described below with reference to the accompany drawings. When an auxiliary power source is added to an electric motor drive device in parallel with the power source thereof (for example, a manganese battery is connected in parallel with an identical manganese battery), the internal resistance r of the battery or power source is reduced to half. Therefore, from Formula (5) given in the foregoing, the terminal voltage E of the motor resulting from this arrangement can be expressed by:

$$E = V - \tfrac{1}{2} r \cdot i$$

The drop of the terminal voltage E thus becomes half of the voltage drop that takes place when no auxiliary power source is used.

Accordingly, in a DC motor in which the terminal voltage E and the rotational speed N are proportional to each other, the rotational speed N of the motor during a loaded driving operation becomes somewhat higher than the speed N obtained without an auxiliary battery. The increase in the rotational speed N results accordingly in an increase in the winding speed of the electric motor drive device. Besides, in a parallel connection, the current consumption i then can be larger. Furthermore, since the current consumption i is close to zero for non-loaded driving, the terminal voltage E is unvarying during non-loaded driving whether an auxiliary power source is provided or not. Therefore, there is no fear of motor breakage.

Furthermore, since a larger degree of current consumption i is possible in this case, the rotational torque T can be close to the maximum output point T2. Therefore, the film winding speed of the camera can be increased by shifting the gear ratio of the transmission mechanism of the electric motor drive device to a smaller gear ratio relative to the high output of the motor without recourse to increasing the rotational speed N of the motor.

In other words, in an electric motor drive device having no auxiliary power source, a certain amount of film feeding can be ensured by the use of the motor in such a manner to bring the rotational torque T to the maximum efficiency point T1. Where the auxiliary power source is added, the gear ratio ε is shifted and the motor is used in such a way as to have the rotational torque at the maximum output point T2. With this arrangement, since the rotational speed of the motor during a loaded driving operation becomes somewhat higher and the output P of the motor reaches a maximum value, as mentioned in the foregoing, the winding speed of the motor drive device is greatly increased and the motor is used at a point close to the maximum output point. Besides, since the power sources are connected in parallel while the consumption current i is increased, a high current can be used over a long period of time to ensure the required amount of feeding.

The arrangement of a gear ratio shiftable in combination with an auxiliary power source connected in parallel in the manner as described in the foregoing enhances the capability of an electric motor drive device in terms of quick photographic mobility resulting from an increased winding speed without the fear of a reduction in the amount of film fed and motor breakage.

Figure 4:
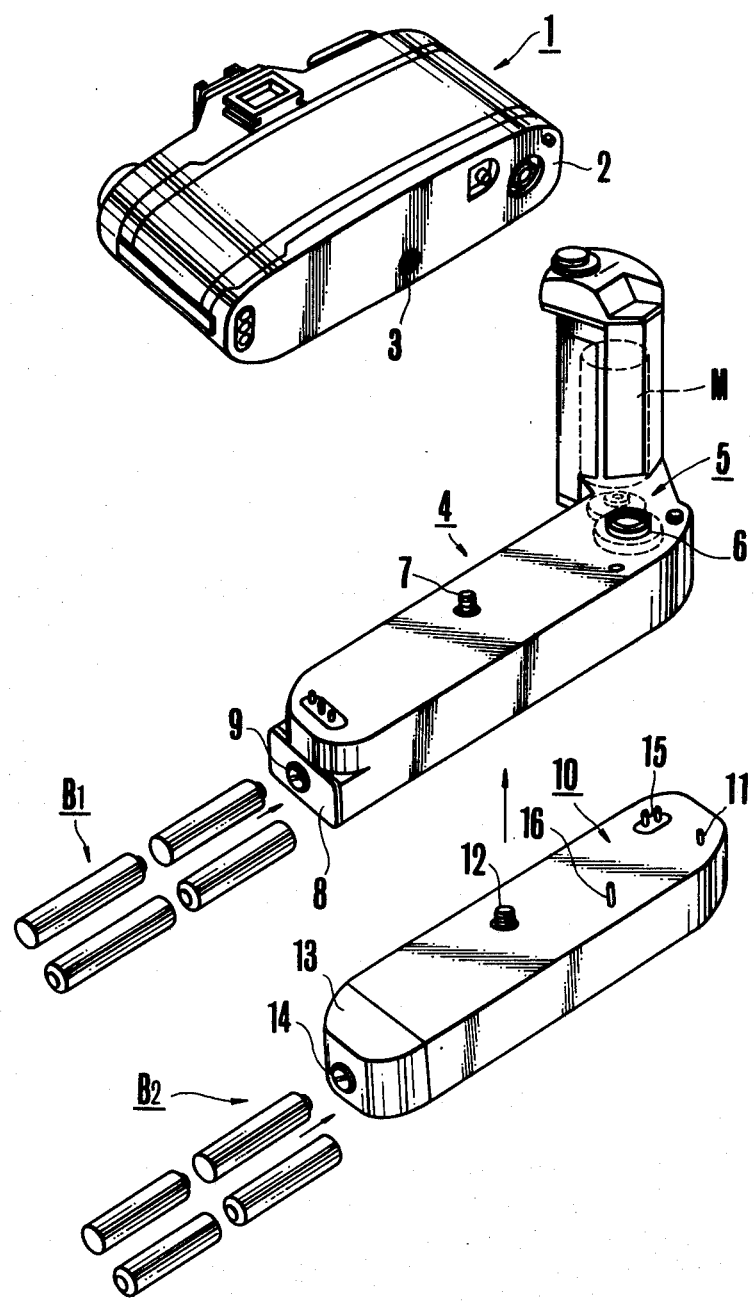
FIG. 4 is a perspective view showing a camera in combination with an electric motor drive device in an embodiment of the present invention.

Referring now to FIG. 4 showing a camera body 1 in combination with an electric motor drive device as an embodiment of the invention, the camera body 1 is provided with a winding coupler 2 which performs a winding action in association with the winding mechanism and shutter mechanism of the camera; and a screw hole 3 for a tripod. The electric motor drive device 4 is provided with a driving motor M; a gear train 5; and a winding coupler 6, which is disposed in a position to be coupled with the coupler 2 which is disposed on the side of the camera body 1. The embodiment includes a screw 7 which is provided for attaching the electric motor drive device body 4 to the camera body 1; batteries B1 which are disposed within the electric motor drive device and are normally manganese batteries; a battery housing lid 8 which is fixed in position with a screw 9; a case 10 housing an auxiliary power source therein; a positioning pin 11 which attaches the case 10 of the auxiliary power source to the electric motor drive device body 4; a screw 12 used in attaching the auxiliary power source case 10 to the electric motor drive device body 4; batteries B2 which are placed within the auxiliary power source case 10 and are also normally manganese batteries; a battery housing lid 13 which is fixed in position with a screw 14; a power supply terminal 15; and a changeover pin 16 which will be described later herein.

Figure 5:
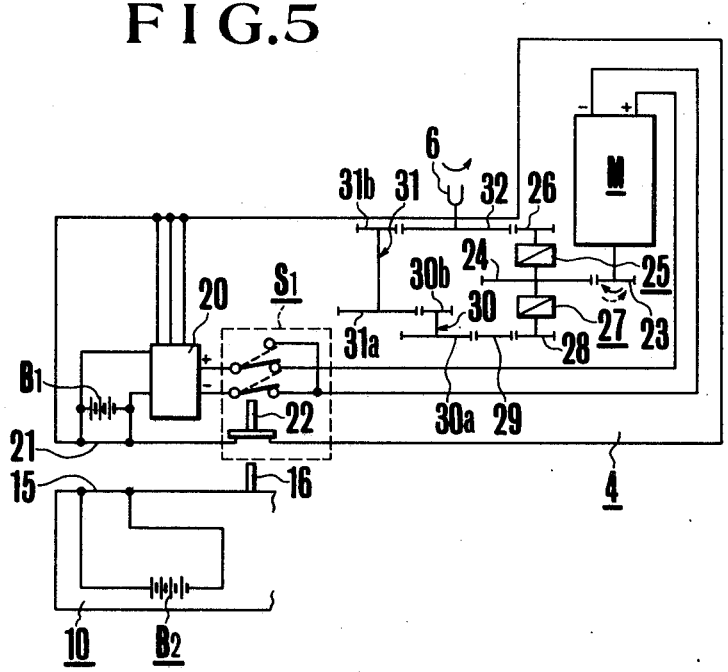
FIG. 5 is a circuit diagram showing a transmission mechanism used in the embodiment shown in FIG. 4.

Referring to FIG. 5, a motor M has a first gear 23 secured to the shaft thereof. The first gear 23 engages a second gear 24, which is connected through a third gear 26 to a first one-way clutch 25.

The first one-way clutch 25 transmits the rotating force of the second gear 24 to the third gear 26 when the motor M rotates in the direction shown by a full line (hereinafter called reverse rotation). When the motor rotates in the direction shown by the broken line (hereinafter called normal rotation), the connection by the first one-way clutch for driving-force transmission is cut off. A second one-way clutch 27 transmits the rotating force of the second gear 24 to a fourth gear 28 at the time of normal rotation of the motor M and does not transmit it at the time of reverse rotation of the motor M. The structural arrangement of the first and second one-way clutches 25 and 27 will be described later.

There is provided a fifth gear 29 which engages the fourth gear 28 and a sixth gear 30. The sixth gear 30 is a double gear consisting of a first gear part 30a which engages the fifth gear 29 and a second gear part 30b which engages a seventh gear 31, the first and second gear parts being a unified body. The seventh gear 31 consists of a first gear part 31a and a second gear part 31b which are one unified body as a double gear. These first and second gear parts 31a and 31b of the seventh gear 31 respectively engage the second gear part 30b of the sixth gear 30 and a winding gear 32. The winding gear 32 has a winding coupler 6 rotated through a seriated relation to the first gear 23 and engages the second gear part 31b of the seventh gear 31 and the third gear 26 respectively transmitting rotation through either of the gear trains to which they belong.

A block 20 represents a well known control circuit of the electric motor drive device. The control circuit 20 controls the operation and stopping of the motor M according to a release completion signal and a winding completion signal received from the camera body 1. The control circuit 20 is provided with a power source connection terminal 21 for connection with the auxiliary power source. The terminal 21 is connected to the connection terminal 15 of the auxiliary power source. The device includes a switch S1 which shifts the connections to the motor when the auxiliary power source case 10 is attached to the device. The connection arrangement of the switch S1 is shifted when the changeover pin 16 provided on the case 10 abuts on a pushing piece 22 of the switch S1. When the auxiliary power source is not in use, a positive potential is given to the + pole of the motor and a negative potential to the — pole thereof, as shown in the drawing, causing normal rotation of the motor. Accordingly, the driving force of the motor M is transmitted to the winding coupler 6 through the gear train consisting of the first gear 23, the second gear 24, the second one-way clutch 27, the fourth gear 28, the fifth gear 29, the sixth gear 30, the seventh gear 31 and the winding gear 32. In this instance, as mentioned in the foregoing, the other gear train which includes the first one-way clutch 25 does not transmit the rotating driving force of the motor M. When the auxiliary power source 10 is attached to the device, the change-over pin 16 causes the switch S1 to change its position. A negative potential is given to the + pole of the motor M and a positive potential to the — pole of the motor. This causes the motor M to reverse rotation. Accordingly, the driving force of the motor M is transmitted to the winding coupler 6 through the first gear 23, the second gear 24, the first one-way clutch 25, the third gear 26 and the winding gear 32.

The operation and the advantage of the electric motor drive device, which is arranged as described in the foregoing, will be understood from the following description:

(i) Operation of the electric motor drive device without the auxiliary power source used:

Referring to FIG. 5, a positive potential is impressed on the + pole of the motor M and a negative potential on the — pole of the motor. The motor M therefore makes a normal rotation. This causes the second gear 24 to rotate counterclockwise through the first gear 23. In this instance, the second one-way clutch 27 transmits the rotation of the second gear 24 to the fourth gear 28 while the rotation is not transmitted to the third gear 26 through the first one-way clutch 25. Therefore, the output of the motor M is reduced through the gear train including the second one-way clutch 27 before it is transmitted to the winding coupler 6. Referring to FIG. 1, the reduction gear ratio obtained through the arrangement from the motor M to the winding coupler 6 in this instance brings the rotational torque T of the motor M to the maximum efficiency point T1 or close thereto.

(ii) Operation with the auxiliary power source attached:

When the auxiliary power source is attached to the electric motor drive device 4, the change-over pin 16 shown in FIG. 5 pushes the pushing piece 22 upward as viewed on the drawing. This causes the switch S1 to shift its position impressing a negative potential on the + pole of the motor M and a positive potential on the − pole of the motor M. Furthermore, with the auxiliary power source attached, the power source connection terminals 21 and 15 are connected resulting in the power source B1 and the auxiliary power source B2 being connected in parallel with each other. Unlike the example of Para. (i) above, the motor in this instance reverses rotation. In this case, the first one-way clutch 25 transmits the rotation of the second gear 24 to the third gear 26. The gear train including the first one-way clutch 25 thus transmits the rotation of the motor M to the winding coupler 6. Again referring to FIG. 1, the reduction gear ratio in this case brings the rotational torque T of the motor M to the maximum output point T2 or close thereto. Since the power sources B1 and B2 are connected in parallel in this case, the internal resistance r is lower than the internal resistance r existing when the power source B1 is used alone. Accordingly, the voltage drop during a loaded motor driving operation becomes less than the voltage drop which takes place when the power source B1 is used alone. This difference in the voltage drop results in an increase in the rotational speed N of the motor. Furthermore, since the gear ratio $\epsilon$ is set at a value less than the ratio set for solo use of the power source B1 to increase the rotational torque T from T1 to T2, the winding speed increases in this case. This advantage results from the parallel connection of the auxiliary power source, which permits use of a larger current. Besides, this arrangement is free from any problems encountered by series connection of an auxiliary power source.

Figure 7:
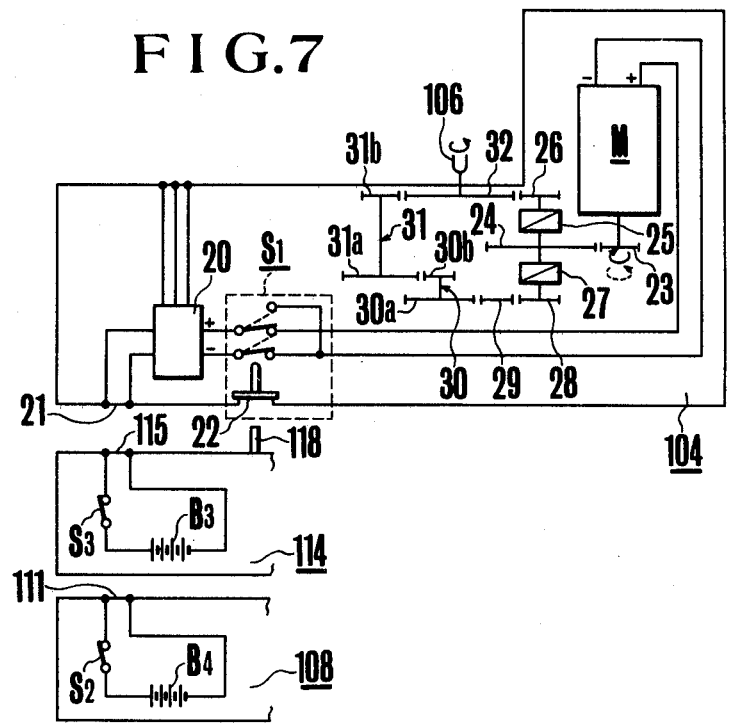
FIG. 7 is a circuit diagram showing the transmission mechanism of the embodiment shown in FIG. 6.
Figure 6:
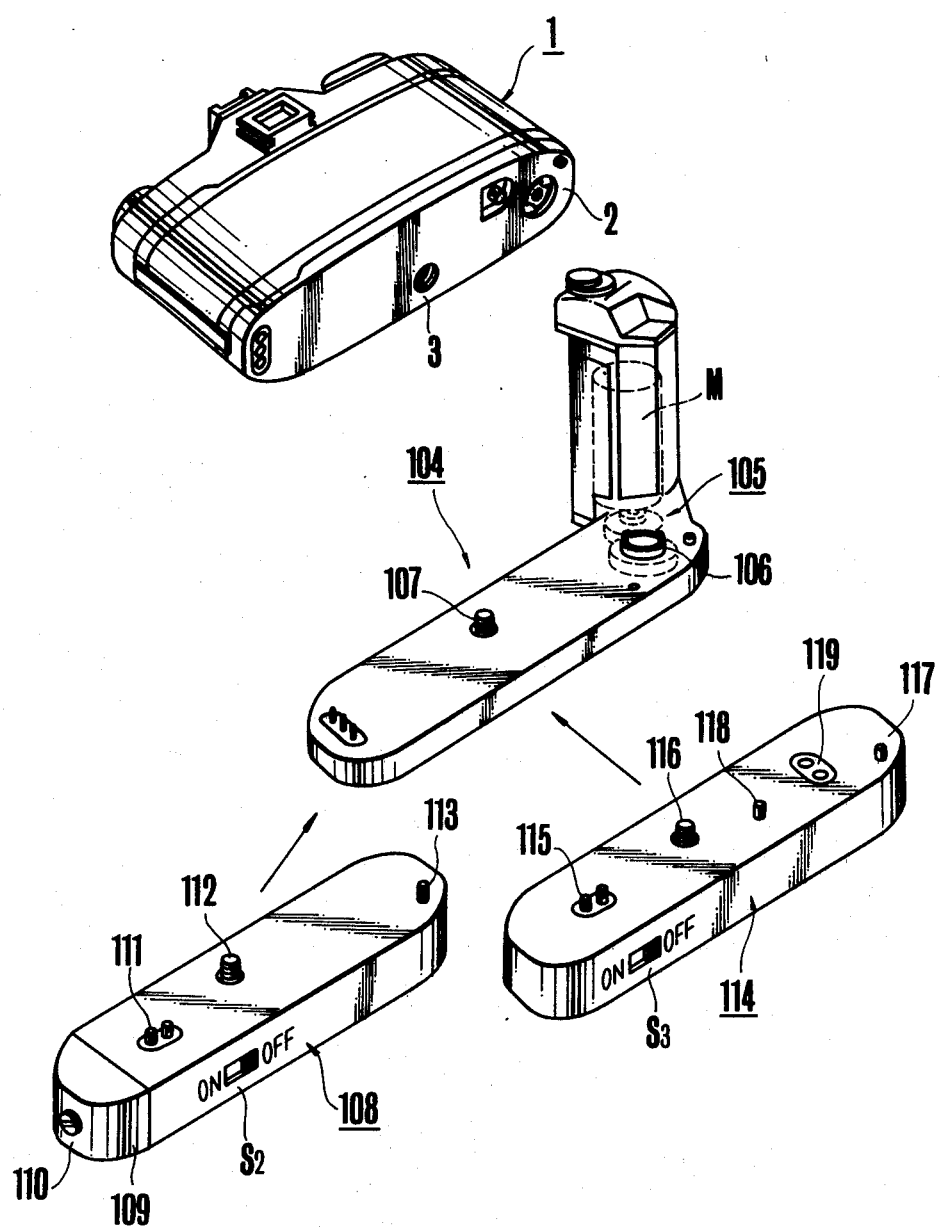
FIG. 6 is a perspective view showing a camera in combination with an electric motor drive device in another embodiment of the invention.

Another embodiment of the present invention is shown in FIGS. 6 and 7, wherein the same parts as those used in the first embodiment described above are indicated by the same reference numerals and symbols.

In FIG. 6, a camera body 1 is provided with a winding coupler 2 which is in the bottom of the camera body 1 and which performs a winding action in association with a winding mechanism and a shutter mechanism in the camera. In the bottom of the camera body 1 is also provided a screw hole 3 for a tripod. The body 104 of the electric motor drive device has a driving motor M and a gear train 105 disposed inside thereof. A winding coupler 106 of the electric motor drive device is disposed in a position to be coupled with the winding coupler 2 disposed on the side of the camera body 1. A screw 107 is provided for attaching the electric motor drive to the camera body 1. A reference numeral 108 identifies a first battery pack which contains therein penlight (size AA) manganese batteries. The first battery pack 108 is provided with a battery lid 109 and a screw 110 for attaching and removing the lid 109 to and from the battery pack 108, so that the batteries can be replaced without difficulty. The pack 108 is further provided with a terminal 111 for supplying the electric motor drive device with power, the terminal being coupled with a terminal provided on the side of the electric motor drive device body. The pack 108 is coupled with the electric motor drive device body 104 with a mounting screw 112 by operating the screw 112 through a mounting knob which is not shown. There is also provided a positioning pin 113 which engages a positioning hole, which is provided in the electric motor drive device body 104,though it is not shown. This power source is provided with a main switch S2.

There is provided a second battery pack 114 which contains therein penlight (size AA) batteries of the Ni-cd type. The second pack 114 is provided with a power supply terminal 115, a mounting screw 116 and a positioning pin 117 which are respectively arranged in the same manner as those of the first battery pack 108. The pack 114 is further provided with a change-over pin 118 which will be described later herein; a terminal 119 is provided for the purpose of charging the Ni-cd batteries; and a main switch S3.

With this embodiment as described above, the electric motor drive device 104 is attached to the camera body 1 by first screwing the mounting screw 107 of the motor drive device body 104 under a prescribed condition into the tripod screw hole 3 of the camera body 1. After the screw 107 engagement is tightened, either of the packs 108 and 114 is brought into a prescribed mounting state inserting the positioning pin 113 or 117 into the positioning hole of the device 104 and is then fixedly attached to the motor drive device body by means of the mounting screw 112 or 116. At that time, the gear ratio of the gear train of the motor drive device is changed and set according to the kind of battery pack used.

The internal arrangement of the electric motor drive device 104 and the battery packs 108 and 114 is shown in FIG. 7. In FIG. 7, the device 104 comprises a motor M; a first gear 23 secured to the shaft of the motor M; a second gear 24 which engages the first gear 23 and is connected to a pair of one-way clutches 25 and 27; a third gear 26 which is connected to the first one-way clutch 25; a fourth gear 28 which is connected to the second one-way clutch 27; a fifth gear 29 which engages both the fourth gear 28 and a sixth gear 30; the sixth gear 30 which is a double gear consisting of a first gear part 30a which engages the fifth gear 29 and a second gear part 30b which engages a seventh gear 31; the seventh gear 31 which is also a double gear consisting of a first gear part 31a engaging the sixth gear 30 and a second gear part 31b engaging a winding gear 32; the winding gear 32 which engages both the seventh gear 31 and the third gear 26; and a winding coupler 106 which is disposed above the winding gear 32. The motor drive device 104 includes a control circuit 20 which is of a known structural arrangement and operates and stops the motor M according to a release completion signal and a winding completion signal coming from the camera body 1. The motor drive device 104 further includes a terminal 21 which is coupled with the power supply terminal 115 or 111 of the battery pack 114 or 108; a pushing piece 22 which is urged downward by a spring and is pushed upward by the change-over pin 118 of the second battery pack 114 only when the second battery pack 114 is attached to the motor drive device 104; and a switch S1 which has its connecting condition shifted when the pushing piece 22 is pushed upward by the change-over pin 118. This switch S1 is provided for the purpose of shifting the gear ratio. Under normal conditions and when the pack 108 is attached to the motor drive device 104, the switch S1 connects each terminal in the manner indicated by a full line in the drawing. Then, the manganese batteries contained in the pack 108 are used as the power source and the motor M rotates in the direction of the arrow as indicated by a full line (the rotation hereinafter will be called normal rotation).

When the pack 114, instead of the pack 108, is attached to the motor drive device 104, the pushing piece 22 is pushed inward by the change-over pin 118 of the pack 114. The pushing piece 22 then brings the connection of each contact of the switch S1 into a condition shown by the broken line in FIG. 7. This causes the motor M to rotate in the direction of the arrow indicated by a broken line in the drawing (hereinafter called reverse rotation).

The pack 108 includes a main switch S2; and manganese batteries B4 which are disposed inside the pack 108. The pack 114 is provided with a main switch S3 and Ni-cd batteries B3 which are disposed inside the pack 114 and are charged through the aforementioned charging terminal 119.

Figure 10:
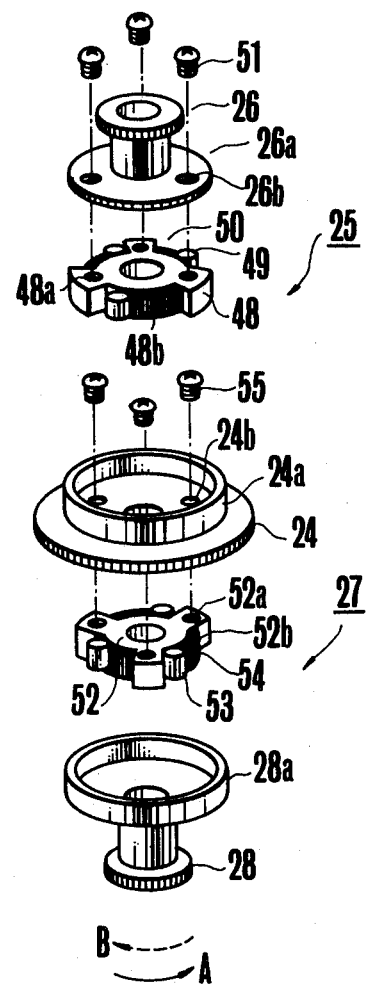
FIG. 10 is a perspective view showing the details of a unidirectional clutch used in an embodiment of the present invention.

FIG. 10 shows a one-way clutch mechanism which is composed of the first one-way clutch 25 disposed between the third gear 26 and the second gear 24 and the second one-way clutch 27 disposed between the fourth gear 28 and the second gear 24. In the one-way clutch mechanism shown in FIG. 10, the second gear 24 has a cylindrical part 24a disposed thereon and holes 24b formed therein. The second gear 24 is secured to a windmill shaped part 52 by means of screws 55 through the holes 24b and holes 52a formed in the part 52. The third gear 26 is provided with a flange part 26a and holes 26b which are in the flange part 26a. The flange part 26a is secured to a windmill shaped part 48 of the clutch 25 by means of screws 51 through the holes 26b and holes 48a formed in the third gear 26 and in the part 48. The fourth gear 28 is provided with a cylindrical part 28a which is disposed above the gear 28. Rollers 53, which are disposed on the windmill shaped part 27 of the second one-way clutch 27, confront the inner circumferential face of the cylindrical part 28a of the fourth gear 28. The first one-way clutch 25 is also provided with rollers 49 which confront the inner circumferential face of the cylindrical part 24a of the second gear 24. Reference numerals 52 and 54 indicate springs.

This one-way clutch mechanism operates in the following manner: When the motor M rotates in the direction of the full line arrow mark (normal rotation), the second gear 24 rotates in the direction of arrow A. The windmill 52 which is secured to the second gear also rotates together with the second gear 24. This causes each of the rollers 53 to move in a biting direction between the tapered part 52b of the windmill 52 and the inner circumference of the cylindrical part 28a of the fourth gear 28. Therefore, the fourth gear 28 rotates together with the windmill 52. Accordingly, the second and fourth gears 24 and 28 respectively rotate together to effect transmission of power. This represents the engaged one-way clutch. Meanwhile, when the second gear 24 rotates in the direction of arrow A, each of the rollers 49 move in an escaping direction between the inner circumference of the cylindrical part 24a of the second gear 24 and the tapered part 48b of the windmill 48. Therefore, the third gear 26 does not rotate despite rotation of the second gear 24. In other words, the one-way clutch 25 is disengaged.

When the motor M makes a reverse rotation, that is, when it rotates in the direction of the broken line arrow mark, the second gear 24 rotates in the direction of arrow B. Since the rotating direction of the second gear 24 is reversed in this case to the rotating direction mentioned in the foregoing, the roller 53 moves in an escaping direction between the tapered part 52b of the windmill 52 and the inner circumference of the cylindrical part 28a while, between the inner circumference of the cylindrical part 24a and the tapered part 48b of the windmill 48, the roller 49 moves in a biting direction. Therefore, when the second gear 24 rotates in the direction of arrow B, the one-way clutch 25 engages and the second and third gears 24 and 26 rotate together to effect transmission of power. Conversely, the other one-way clutch 27 disengages. Therefore, the fourth gear 28 does not rotate.

This embodiment operates in the following manner: When the battery pack 108 which contains the manganese batteries B4 is attached to the motor drive device, the switch S1 connects each terminal as indicated by the full line in FIG. 7. Accordingly, when the power supply to the motor M is effected by the batteries B4 through the supply terminals 111 and 21 and the control circuit 20 in response to a release completion signal from the camera, the motor M rotates in the direction of the full line arrow, as shown in FIG. 7. With the motor rotated in that direction, the first gear 23 and the second gear 24 rotate. In this case, the second clutch 27 engages, thus transmitting the driving force to the fourth gear 28. Meanwhile, the first one-way clutch 25 is disengaged and the driving force is not transmitted to the third gear 26. Accordingly, the driving force of the motor M is transmitted to the winding coupler 106 through the gear train consisting of the first gear 23, the second gear 24, the fourth gear 28, the fifth gear 29, the sixth gear 30, the seventh gear 31 and the winding gear 32. The winding coupler 6 then transmits the driving force to the winding coupler 2 which is disposed on the side of the camera body 1. In this instance, although the third gear 26 also rotates, it does not participate in the transmission of the driving force between the motor M and the winding coupler 6 because the one-way clutch 25 is disengaged between the second gear 24 and the third gear 26.

Figure 3A:
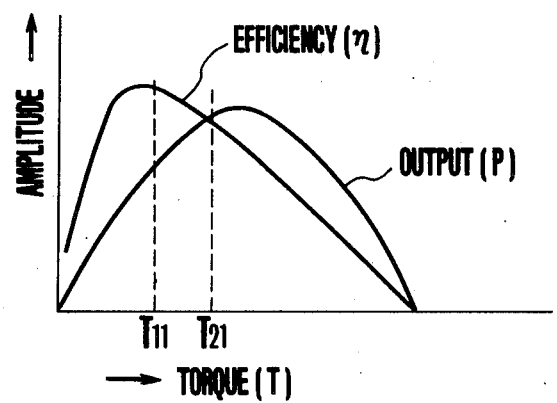
FIGS. 3(a) and 3(b) are graphs showing the characteristic curves of a DC motor obtained with the manganese battery and the Ni-cd battery.

The gear ratio $\epsilon$ of the gear train in this instance is preset to have the rotational torque of the motor M satisfy the following condition: The rotational torque T of the motor M then must be a value between the maximum efficiency point T11 and the maximum output point T21, obtainable with the manganese batteries employed as shown in FIG. 3(a). It will be apparent from Formula (2) given in the foregoing that the rotational torque T of the motor M is adjusted by the gear ratio $\epsilon$, with the winding torque H assumed constant.

When the other battery pack 114 containing the Ni-cd batteries B3 is attached to the electric motor drive device 104, the change-over pin 18 of the pack 114 pushes up the pushing piece 22 of the motor drive device 104 to shift the position of the switch S1, as mentioned in the foregoing. This brings each terminal into contact as represented by a broken line in the drawing. The polarity of the motor M reverses to the polarity obtained with the pack 108 and the motor M reverses rotation.

Then, with the motor's power supply effected through the control circuit 20, the driving force of the motor M is transmitted to the winding coupler 106, unlike in the abovementioned case, through a gear train consisting of the first gear 23, the second gear 24, the third gear 26 and the winding gear 32. The coupler 106 then transmits the driving force to the winding coupler 2, which is disposed on the camera's side.

Despite the difference in the rotating direction of the motor M, i.e., the normal rotation and the reverse rotation, the rotating direction of the winding coupler 106 remains unchanged because of the difference in the number of gears employed.

Figure 3B:
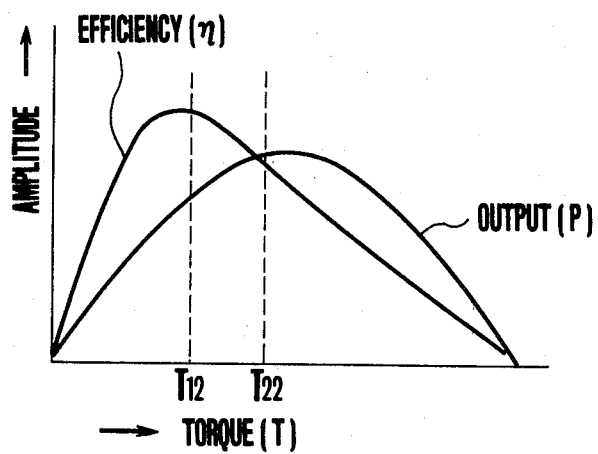

Furthermore, the gear ratio $\epsilon$ of the gear train, formed in this case, is preset to have the rotational torque T of the motor M satisfy the following condition: The rotational torque T of the motor M must be a value between the maximum efficiency point T12 and the maximum output point T22 obtainable with the Ni-cd batteries used as shown in FIG. 3(b).

Figure 8:
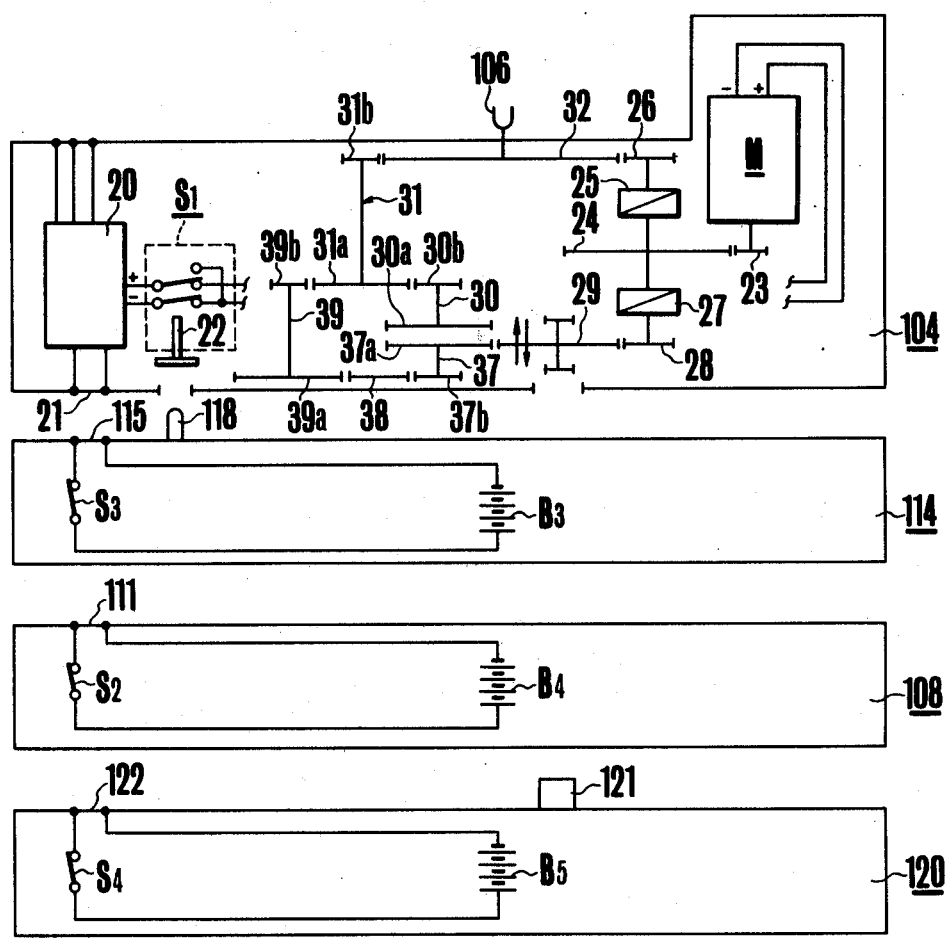
FIG. 8 is a circuit diagram showing a modification of the transmission mechanism of FIG. 7 in a further embodiment of the invention.

A further example of the embodiment of the present invention is shown in FIG. 8. In this case, the gear train is shiftable in three steps. To the gear train used in the embodiment shown in FIG. 7 are added an eighth gear 37, a ninth gear 38 and a tenth gear 39. The fifth gear 29, which engages the first gear part 30a of the sixth gear 30, is movable in the axial direction to also selectively engage the first gear part 37a of the eighth gear 37. The ninth gear 38 engages the second gear part 37b of the eighth gear 37 and the first gear part 39a of the tenth gear 39. The tenth gear 39 has the second gear part 39b thereof engage the first gear part 31a of the seventh gear 31. There is provided a third battery pack 120 which contains therein batteries B5 which are different from the afore-mentioned manganese and Ni-cd batteries. The pack 120 is provided with a terminal 122 and a protruding piece 121. When the pack 120 is attached to the electric motor drive device 104, the terminal 122 contacts the terminal 21 to connect the batteries B5 to the control circuit 20. In the meantime, the protruding piece 121 moves the fifth gear 29 upward, as viewed in FIG. 8, in such a way as to cause the fifth gear to engage the first gear part 30a of the sixth gear 30. Accordingly, in this embodiment, the driving force is transmitted in three different ways, as described below:

When the pack 114 is attached to the motor drive device 104, the motor M rotates normally. The driving force of the motor M is transmitted through the first gear 23, the second gear 24, the one-way clutch 25, the third gear 26 and the winding gear 32. When another pack 108 is attached to the motor drive device 104, the motor M reverses rotation. Then, with the fifth gear 29 in engagement with the first gear part 37a of the eighth gear 37, the driving force of the motor M is transmitted through the first gear 23, the second gear 24, the one-way clutch 27, the fourth gear 28, the fifth gear 29, the eighth gear 37, the ninth gear 38, the tenth gear 39, the seventh gear 31 and the winding gear 32. When the pack 120 is attached to the motor drive device, the motor M reverses rotation. Then, with the fifth gear 29 in engagement with the first gear part 30a of the sixth gear 30, the driving force of the motor M is transmitted through the first gear 23, the second gear 24, the one-way clutch 27, the fourth gear 28, the fifth gear 29, the sixth gear 30, the seventh gear 31 and the winding gear 32.

In this embodiment, the gear ratio $\epsilon$ is also preset according to the batteries B5 as in other embodiments.

Figure 9:
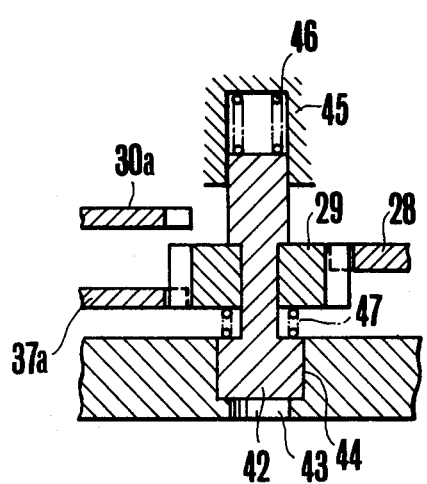
FIG. 9 is an enlarged detail view showing the essential parts of the transmission mechanism of FIG. 8.

Referring now to FIG. 9, the change-over arrangement of the fifth gear 29 comprises a support shaft 42 which rotatably fits the fifth gear 29 in position; bearings 44 and 45 which slidably support the support shaft 42; and the springs 46 and 47. Meanwhile, the motor drive device 104 has a hole 43 in the bottom thereof to permit insertion of the protruding piece 121 which is secured to the pack 120. The spring 46 urges the support shaft 42 downward as viewed on the drawing. The other spring 47 urges the support shaft 42 upward. Under normal conditions, or when the pack 120 is not attached, these parts mentioned above are respectively kept in the positions illustrated in FIG. 9.

When the third battery pack 120 is attached to the motor drive device 104, the protruding piece 121 of the battery pack 120 pushes the support shaft 42 upward as viewed in the drawing. Accordingly, the fifth gear 29 is disengaged from the first gear part 37a of the eighth gear 37 and engages the first gear part 30a of the sixth gear 30. If, in this instance, the fifth gear 29 and the sixth gear 30 are out of phase in relation to each other, the spring 47 merely brings the fifth gear 29 into contact with the lower surface of the sixth gear 30 after the fifth gear 29 disengages the eighth gear 37. However, during the winding action, even a slight rotation of the motor M rotates the fifth gear and immediately engages the sixth gear 30 with the aid of the uplifting force of the spring 47. The change-over of the gear train is effected in this manner.

In accordance with the invention, as has been described in the foregoing, the apparent internal resistance of the power source is lowered to increase the rotational frequency of the motor during its loaded driving action, without increasing the rotational frequency of the motor during its non-loaded rotation, by parallel connection of the auxiliary power source. The arrangement, according to the invention, permits the use of a large current to obtain a large output of the motor. Furthermore, increasing the winding speed by automatic change-over of the gear ratio enhances the capability of the motor drive device for quick photography. It is another advantage of the invention that the motor, which serves as the heart of the drive device, has no fear of breakage. With the auxiliary power source added, making the winding speed variable by automatic shifting of the gear ratio ensures the advantageous effect of the embodiments of the invention.

Furthermore, in accordance with the invention, the rotational torque of the motor suited to the kind of batteries in use can be obtained when battery packs containing batteries of different kinds are attached to the motor driving device. The invention, therefore, permits utilization of the overall efficiency and output of the whole motor driving system consisting of the motor and the power source depending on the kind of power source in use. For example, when the manganese battery, which does not give a large current because of its relatively large internal resistance, is used as the power source, the gear ratio is automatically shifted to lower the motor torque for efficient use of the power source. In the Ni-cd battery which has low internal resistance and gives a large current, the gear ratio is shifted to increase the motor torque for a higher output. This arrangement, according to the invention, results in the improved capability of the motor drive device for quick photography. Therefore, the invention permits efficient utilization of a limited capacity power source for enhancement of the motor drive device. Since the shifting action on the above-mentioned gear ratio is automatically performed by attaching the power source pack to the motor drive device, this advantageous function of the invention can be added to the motor drive device without impairing the operability thereof.

What we claim:
1. An electric motor drive device for a camera with an attachable battery pack, comprising:
   (a) a motor;
   (b) first and second gear trains for transmitting the driving force of the motor, the gear ratio of said first gear train being set at a value at which the rotation torque of the motor is brought closer to a maximum efficiency point than the gear ratio of said second gear train, while the gear ratio of said second gear train is set at a value at which the rotation torque of the motor is brought closer to a maximum output point than the gear ratio of said first gear train;

(c) connecting means, said means connecting the auxiliary batteries provided in the battery pack parallel to the batteries provided in the electric motor drive device when the battery pack is mounted on the electric motor drive device; and (d) change-over means for selecting one of the first and second gear trains, said change-over means being changed over according to the mounting of the battery pack on the electric motor drive device so as to select the second gear train.

2. An electric motor drive device according to claim 1, wherein each gear ratio of the first and second gear trains has a value at which the rotation torque of the motor is set between the maximum efficiency point and the maximum output point.

3. An electric motor drive device according to claim 2, wherein said first gear train has a gear ratio required for setting the rotation torque of said motor close to a maximum efficiency point; and said second gear train has a gear ratio required for setting the rotation torque of said motor close to a maximum output point.

4. An electric motor drive device for a camera on which a first battery pack and a second battery pack having batteries with different characteristics of the batteries provided in the first battery pack can be mounted comprising:

(a) a motor;

(b) first and second gear trains for transmitting the driving force of the motor, said first gear train having a gear ratio which sets the rotation torque of the motor between a maximum efficiency point and a maximum output point according to the characteristics of the batteries provided in the first battery pack, while said second gear train has a gear ratio which sets the rotation torque of the motor between a maximum efficiency point and a maximum output point according to the characteristics of the batteries provided in the second battery pack; and (c) change-over means for selecting the first gear train when the first battery pack is attached to the electric motor drive device and the second gear train when the second battery pack is attached to the electric motor drive device.

* * * * *